Figure 1:
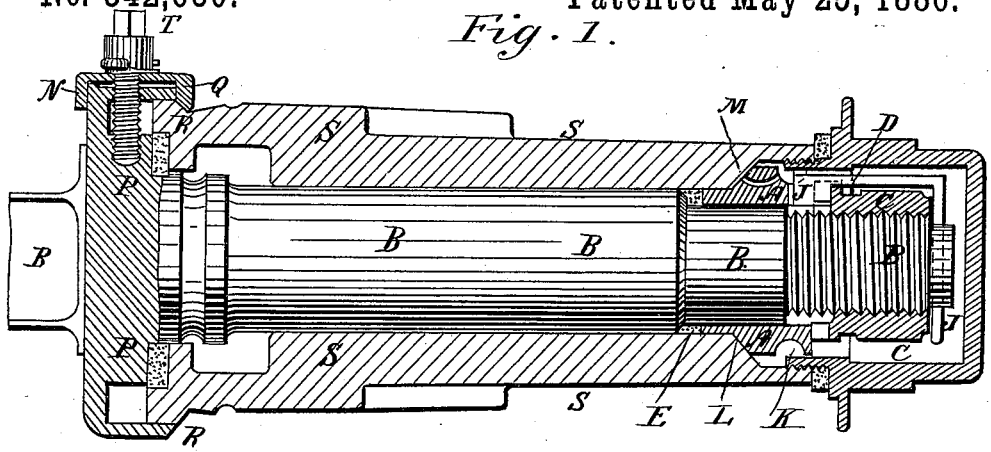

(No Model.)  2 Sheets—Sheet 1.

E. PARTRIDGE.
HUB ATTACHING DEVICE.

No. 342,630.  Patented May 25, 1886.

Witnesses:
Percy B. Hills.
Robert Everitt.

Inventor:
Ebenezer Partridge.
By James L. Norris.
Atty.

(No Model.) 2 Sheets—Sheet 2.

E. PARTRIDGE.
HUB ATTACHING DEVICE.

No. 342,630. Patented May 25, 1886.

Witnesses.
Percy B. Hills.
Robert Everett.

Inventor,
Ebenezer Partridge
By James L. Norris.
Atty.

UNITED STATES PATENT OFFICE.

EBENEZER PARTRIDGE, OF BIRMINGHAM, COUNTY OF WARWICK, ENGLAND.

HUB-ATTACHING DEVICE.

SPECIFICATION forming part of Letters Patent No. 342,630, dated May 25, 1886.

Application filed April 5, 1886. Serial No. 197,876. (No model.) Patented in England April 28, 1885, No. 5,273.

*To all whom it may concern:*

Be it known that I, EBENEZER PARTRIDGE, a subject of the Queen of Great Britain, residing at Poplar Avenue, Edgbaston, Birmingham, in the county of Warwick, England, have invented an Improved Means and Apparatus for Securing Wheels on their Axles with Means of Adjusting the Same for Wear, (for which I have obtained a patent in Great Britain, No. 5,273, bearing date April, 28, 1885,) of which the following is a specification.

The object of my invention is to so make a collet for an axle that the tightening-nut can be put in connection with the collet so as to form part of same, to enable the nut when turned to withdraw the collet, as well as to prevent its working loose away from the nut after it has been screwed up, as required, close to the axle or to a leather washer thereon, and be held securely by a pin which is passed into notches of the nut and collet and an elongated hole in axle end, and which pin may be plain or modified by prong-shape end to drop over elongated flats on sides of axle ends, instead of employing elongated holes.

For the purpose of my invention I form a collet with a full half-band flange, fixed on or loose, as most practicable, recessed or grooved for the reception of a bead or ring on the nut, which is held so as to form part of said collet when put together, yet to serve as a distinct nut when removed from the collet. The inner face of the nut is notched, into which notches and the collet a pin or key is lodged and goes through the elongated hole in axle end, to prevent the nut receding or moving from its adjusted position; or, if prong-shaped end pin is preferred, then it is dropped over flat sides of axle end instead of elongated hole. The loose half-band flange corresponds to the one of fixed position in shape, but is more simple in application, being only just placed over side of nut and collet, (after removing pin or key J,) connecting both when collet is required to be withdrawn. The collet periphery is broad and has a chamber for oil, which can escape to the cone of the collet through an aperture provided for it. I fit a plate on the solid collar and cause a lip thereon to bear against a shoulder round end of the box, to prevent the wheel running off should the axle break within the box, said plate being secured by a screw-pin, which also passes or screws into the solid collar when a cotter is inserted in pin to prevent its working loose.

This invention is specially applicable to the Collinge pattern axles; but it is intended for other axles in which an adjustment is required—such as in tricycles and in certain parts of machinery, lathes, and the like.

Figure 1 of the annexed drawings is a sectional view of a "Collinge" or carriage axle and box constructed according to my invention. A is the collet, of gun-metal or other suitable material, upon the axle B. The tightening nut C being connected with said collet A by means of the half-band flange D, the nut C easily withdraws or forces the collet A close to the axle or to a leather washer, E.

Figure 2:
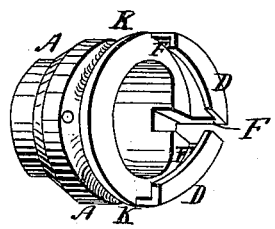
Figure 3:
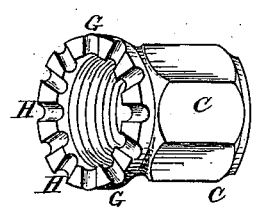
Figure 4:
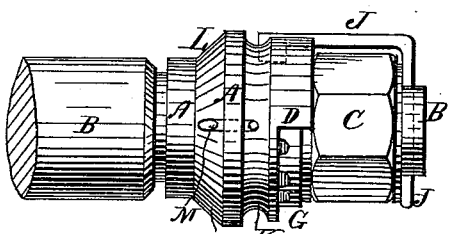

Fig. 2 is a perspective view of the collet A, with half-band flange D, having a recess or groove, F, for the reception of a bead or ring, G, on the nut C. (Shown in perspective at Fig. 3.) The inner face, H, of the nut C has notches into which and into the notch I of the collet A, a pin or key, J, is lodged with either plain or prong-shaped end, as shown at Figs. 1 and 4, said pin or key J also passing through the elongated hole in the axle end B, or, if the prong-shaped end pin is used it fits over flat sides of axle end instead of elongated hole, to prevent the nut receding or moving from its adjusted position. The collet periphery has a chamber, K, for oil, which can escape to the cone L of the collet through an aperture, M, provided for it.

Figure 5:
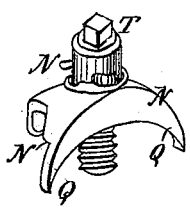

Fig. 5 shows the plate N on the solid collar P, having a lip, Q, thereon, which bears against a shoulder, R, formed round the end of the axle-box S, said plate N being secured by a screw-pin, T, which also passes and screws into the collar P of the axle. A cotter is then inserted through head of the screw-pin T, to prevent its working loose; also, oil may be poured in pin-hole T, for lubrication.

Figure 6:
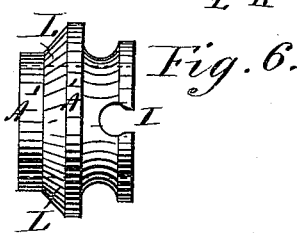
Figure 7:
Figure 8:
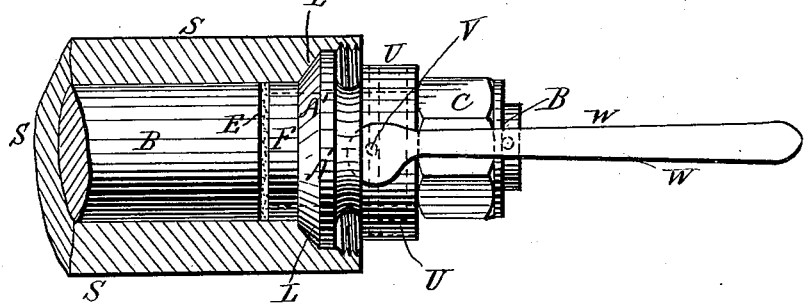

Fig. 6 shows a loose collet, A', which may be used instead of the collet, Fig. 2, as found most practicable, and which can be withdrawn in conjunction with the tightening-nut C, when desired, by means of the loose half-band flange U, (shown at Fig. 7, with handle W.) The loose half-band flange U is provided with a pin, V, to take into the notch I (after first removing pin or key) of the loose collet, and is applied to withdraw the collet by placing it over the rings or flanges of the said collet and tightening-nut C, as indicated by Fig. 8. The loose half-band flange U can be used without the handle W, as most practicable.

Figure 9:
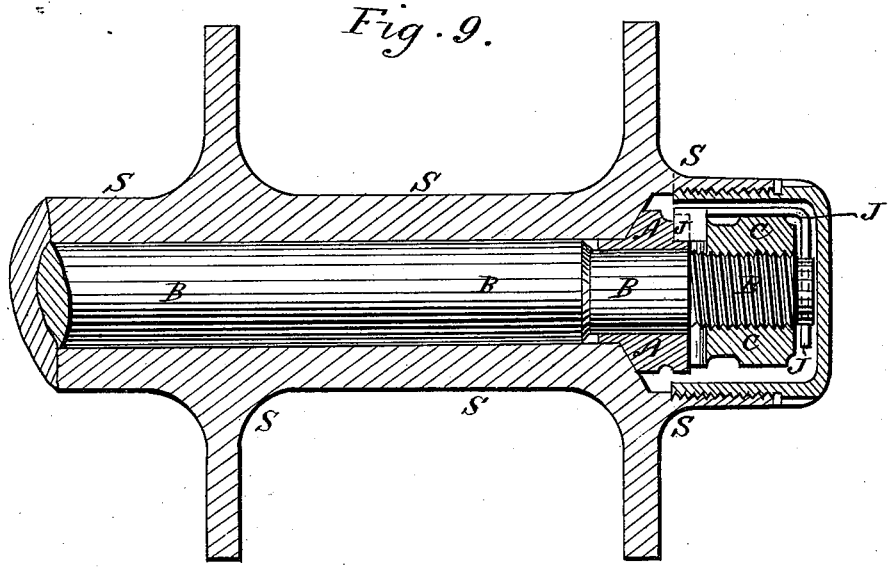
Figure 10:
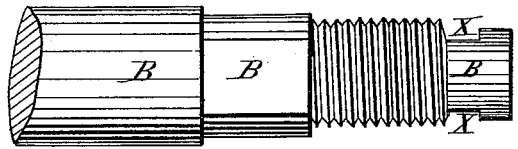
Figure 11:
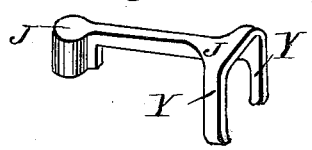

Fig. 9 shows a modified arrangement of my invention, applicable to bicycles, tricycles, lathes, and other machines having similar axles. The same arrangement may be employed as described with reference to the Collinge or carriage axle, or a slight modification thereof. The prong-shaped end pin or key may be used instead of plain pin J, and the axle end may be formed with flat sides X X, for the prongs Y to drop over, as will be understood by reference to Figs. 10 and 11.

Having fully described my invention, what I claim, and desire to secure by Letters Patent, is—

1. The combination of the axle B, the collet A, having half-band flange D, provided with recess F, the nut C, and the pin J, engaging the axle and collet-band, substantially as described.

2. The combination of the axle B, axle-box S, collet A, having groove K, beveled inner side, L, and aperture M, the nut C, and pin J, substantially as described.

3. The combination of the axle B, the collet A, having recess F and notch I, the washer E, the nut C, having a notched head or ring, G, and the pin J, engaging the collet and axle, substantially as described.

4. The combination of the axle B, axle-box S, having shoulder R, the collar P, plate N, having lip Q, and the screw-pin T, substantially as described.

In witness whereof I have hereunto signed my name in the presence of two subscribing witnesses.

EBENEZER PARTRIDGE.

Witnesses:
  HENRY GARDNER,
  RICHARD CORE GARDNER,
*Both of* 166 *Fleet Street, London, England.*